United States Patent
Huai et al.

(10) Patent No.: US 7,284,316 B1
(45) Date of Patent: Oct. 23, 2007

(54) METHOD FOR FORMING A HARD BIAS STRUCTURE IN A MAGNETORESISTIVE SENSOR

(75) Inventors: Yiming Huai, Pleasanton, CA (US); Jinqiu Zhang, Fremont, CA (US); Jing Zhang, San Jose, CA (US)

(73) Assignee: Western Digital (Fremont), LLC, Lake Forest, CA (US)

( * ) Notice: Subject to any disclaimer, the term of this patent is extended or adjusted under 35 U.S.C. 154(b) by 348 days.

(21) Appl. No.: 10/991,712

(22) Filed: Nov. 17, 2004

(51) Int. Cl.
*G11B 5/127* (2006.01)
*H04R 31/00* (2006.01)

(52) U.S. Cl. ............... 29/603.16; 29/603.08; 29/603.13; 29/603.15; 29/603.18; 216/62; 216/65; 216/66; 360/324.11; 360/324.12; 427/127; 427/128; 451/5; 451/41

(58) Field of Classification Search ............ 29/603.07, 29/603.08, 603.11–603.16, 603.18; 360/324.11, 360/324.12; 216/62, 65, 66; 427/127, 128; 428/692, 694
See application file for complete search history.

(56) References Cited

U.S. PATENT DOCUMENTS

| 5,018,037 A | 5/1991 | Krounbi et al. |
| 5,434,826 A | 7/1995 | Ravipati et al. |
| 5,491,600 A | 2/1996 | Chen et al. |
| 5,532,892 A | 7/1996 | Nix et al. |
| 5,742,459 A | 4/1998 | Shen et al. |
| 5,892,641 A * | 4/1999 | Ishiwata ............... 360/327.1 |
| 6,340,533 B1 | 1/2002 | Ueno et al. |
| 6,353,318 B1 * | 3/2002 | Sin et al. ............... 324/252 |
| 6,449,135 B1 * | 9/2002 | Ding et al. ............ 360/327.31 |
| 6,551,357 B1 * | 4/2003 | Madduri ............... 715/512 |

FOREIGN PATENT DOCUMENTS

JP          09161230 A    *    6/1997

\* cited by examiner

*Primary Examiner*—Paul D. Kim (57) ABSTRACT

A method for forming a hard bias structure in a magnetoresistive sensor is disclosed. A magnetoresistive sensor having a soft magnetic bias layer, spacer layer, and a magnetoresistive layer, is formed over a substrate having a gap layer. A mask is formed over a portion of the magnetoresistive sensor structure to define a central region. The masked structure is ion milled to remove portions not shielded by the mask, to form the central region with sloped sides, and to expose a region of the gap layer laterally adjacent the sloped sides. A first underlayer is deposited onto at least the sloped sides at a high deposition angle. A second underlayer is deposited to at least partially overlap the first underlayer, and at a first lower deposition angle. A hard bias layer is deposited over at least a portion of the second underlayer, and at a second lower deposition angle.

36 Claims, 7 Drawing Sheets

METHOD FOR FORMING A HARD BIAS STRUCTURE IN A MAGNETORESISTIVE SENSOR

BACKGROUND

This invention relates to magnetic data read heads and, particularly, to a thin film magnetic read head having a magnetoresistive read transducer.

A magnetic data storage system includes, generally, a storage medium, such as a tape or desk in which the data are stored in the form of small magnetized areas; a write element, which writes data to the storage medium by magnetizing the small data bits in the medium; and a read element, which senses the recorded magnetized areas. Modern read sensors are based on the phenomenon of magnetoresistance, that is, the change in resistance of a material when a magnetic field is applied.

Magnetoresistive (MR) sensors having a spin valve structure have been employed as read transducers in magnetic disk read/write heads. Spin valve MR sensors are capable of exhibiting a giant magnetoresistance (GMR) effect, and can provide for high magnetic field sensitivity in magnetic read heads. Generally, the spin valve MR sensor includes two magnetic layers separated by a non-magnetic spacer layer. One of the magnetic layers has its magnetization direction pinned, for example by coupling to an adjacent anti-ferromagnetic (AFM) layer; the other magnetic layer is free to switch magnet position direction in the presence of an applied magnetic field. Spin-dependent electron scattering causes changes in the magnetoresistance, depending upon the angular difference between the magnetization directions in the pinned and the free magnetic layers. A low-resistance state results when the magnetic layers are ferromagnetically aligned, and a high-resistance state results in the antiferromagnetic configuration.

Various materials have been employed in the construction of the various layers of spin valve MR sensors, and some of the layers may be multi-laminate; and other layers may be present in a spin valve MR structure. A hard bias layer laterally adjacent to the spin valve structure on both sides can help stabilize the free layer. A pair of conducting leads can be formed over the hard bias layer, one on each side of the spin valve structure, to pass the sense current.

Figure 1A:
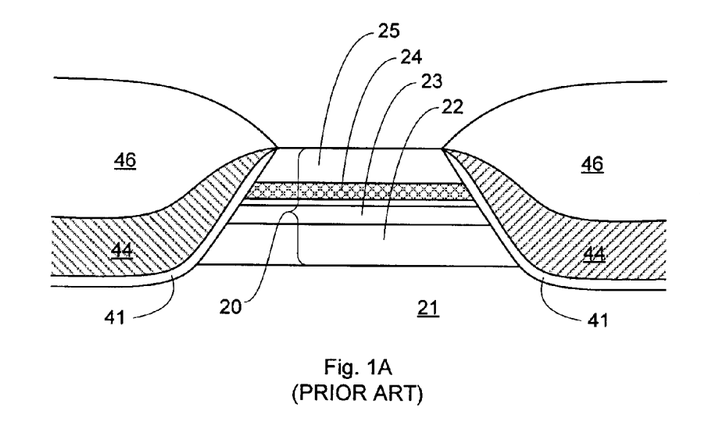
FIG. 1A is a diagrammatic sketch in a sectional view showing a spin valve magnetoresistive sensor of the prior art.

Features of a conventional spin valve MR sensor are shown by way of example in FIG. 1A. Generally, the spin valve structure 20 is formed by deposition of constituent layers of the structure over a gap layer 21, followed by masking and ion milling to remove the layers adjacent the spin valve structure 20 on either side, and to remove a surface portion of the gap layer 21 ("overmilling"). The resulting spin valve structure has sloping sides. In the bottom synthetic spin valve structure shown in this example, the layers include an antiferromagnetic (AFM) layer 22, a pinned layer 23, a free layer 24, and a capping layer 25. An underlayer 41 is formed upon the overmilled portion of the gap layer 21, and on the sloping sides of the spin valve structure 20, and a hard bias layer 44 is formed upon the underlayer 41. The hard bias layer 44 in a conventional spin valve MR sensor such as that illustrated in FIG. 1A may consist of CoPt, for example, and the underlayer 41 may consist of Cr, for example. The gap layer is typically formed of alumina ($Al_2O_3$), for example, and, where the substrate is a material different from the gap layer (for example, a silicon wafer), the gap layer is formed by deposition onto the substrate. Electrically conductive leads 46 are formed over the hard bias layer.

As is well known, the spin valve structure 20 may include other layers, and certain of the identified layers may themselves be laminates. A spin valve structure is conventionally termed a "bottom" spin valve where, as in this example, the AFM is situated below the free layer, that is, between the gap and the free layer.

Figure 1B:
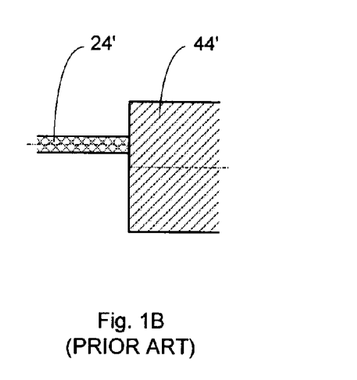
FIG. 1B is a diagram illustrating relative positions of the free layer and the hard bias layer in the prior art spin valve magnetoresistive sensor of FIG. 1A.

The relative positions (elevations above the gap layer) of the free layer 24 and the hard bias layer 44 in the conventional spin valve MR sensor of FIG. 1A is illustrated diagrammatically in FIG. 1B. The thickness of the hard bias layer is much less than that of the spin valve structure, and appropriate alignment of the hard bias layer and the free layer is difficult to obtain using conventional processing methods. As the diagram shows, a plane generally parallel to the various layers, and located midway through the thickness 44' of the hard bias layer, passes entirely below the free layer 24. And, as the diagram shows, a plane generally parallel to the various layers, and located midway through the thickness 24' of the free layer passes well above the mid-plane of the hard bias layer, and in this illustration passes above the upper surface of the hard bias layer 44 in a region away from spin valve structure 20.

SUMMARY

In one aspect the invention can be considered as a method for forming a hard bias structure in a magnetoresistive sensor, by: providing a substrate including a gap layer; forming magnetoresistive sensor structure over the substrate, the magnetoresistive sensor structure comprising at least a soft magnetic bias layer, a spacer layer over the soft magnetic bias layer, and a magnetoresistive layer over the spacer layer; forming a bilayer mask over the magnetoresistive sensor structure to define a central region of the magnetoresistive sensor, the mask having a narrower lower layer and a broader upper layer; ion milling the masked magnetoresistive structure to remove portions of the magnetoresistive sensor structure not shielded by the mask, to form a central region of the magnetoresistive sensor having sloped sides; forming a first underlayer onto the sloped sides of the central region and onto the exposed substrate by depositing a first underlayer material at a relatively high deposition angle (i.e. a first lower deposition angle); forming a second underlayer on a portion of the first underlayer by depositing second underlayer material at a relatively low deposition angle; and forming a hard bias layer on the second underlayer by depositing a hard bias material at a relatively low deposition angle (i.e. a second lower deposition angle).

In another aspect the invention can be considered as a method for making a magnetoresistive sensor, by: providing a substrate including a gap layer; forming a magnetoresistive sensor structure over the substrate, the magnetoresistive sensor structure comprising at least a soft magnetic bias layer, a spacer layer over the soft magnetic bias layer, and a magnetoresistive layer over the spacer layer; forming a bilayer mask over the magnetoresistive sensor structure to define a central region of the magnetoresistive sensor, the mask having a narrower lower layer and a broader upper layer; ion milling the masked magnetoresistive structure to remove portions of the magnetoresistive sensor structure not shielded by the mask, to form a central region of the magnetoresistive sensor having sloped sides; forming a first underlayer onto the sloped sides of the central region and onto the exposed substrate by depositing underlayer material at a relatively high deposition angle; forming a second underlayer on a portion of the first underlayer by depositing underlayer material at a relatively low deposition angle; forming a hard bias layer on the second underlayer by depositing hard bias material at a relatively low deposition angle; and forming leads over the hard bias layer.

In another aspect the invention can be considered as a magnetoresistive sensor, including: a central region including a free layer and having sloped sides, formed on a substrate including a gap layer; an underlayer covering the sloped sides and portions of the substrate laterally adjacent the central region, the underlayer having a thickness over the sloped sides in a range from about 20 Å to about 80 Å, more usually in a range from about 20 Å to about 70 Å, such as about 20 Å or about 30 Å, and having a thickness over the laterally adjacent substrate portions in a range from about 60 Å to about 250 Å, such as about 130 Å; and a hard bias layer over the underlayer.

DETAILED DESCRIPTION

An improved alignment of the hard bias layer with the free layer in a thin film spin valve MR sensor may be obtained by the depositing a hard bias underlayer in stages employing different deposition angles. Preferably, the alignment causes a plane midway through the thickness of the hard bias layer to pass through the free layer and, in an ideal case, the mid-plane of the hard bias layer is coextensive with a plane midway the thickness of the free layer. Preferably, after the constituent layers of the spin valve structure have been deposited over the gap layer, a patterned bilayer mask (stencil) is employed. The patterned bilayer mask preferably includes an upper mask portion and an undercut lower mask portion. The spin valve structure is preferably defined by ion milling (and optionally overmilling into the gap layer). Then a first hard bias underlayer is formed by depositing underlayer material onto the sloped sides of the spin valve structure and onto an exposed portion of the gap layer. The first hard bias underlayer deposition is carried out at a relatively high deposition angle. Then a second hard bias underlayer is formed by depositing underlayer material onto a portion of the first underlayer. The second hard bias underlayer deposition is carried out at relatively low deposition angle (i.e. a first lower deposition angle). An undercut in the lower portion of the bilayer mask can permit underlayer material to be deposited onto the sloped sides of the spin valve structure as well as onto the exposed portion of the gap layer when the higher deposition angle is employed, while masking at least an upper portion of the sloped sides of the spin valve structure when the lower deposition angle is employed. As a result, a greater thickness of hard bias underlayer may be achieved, while the thickness of the hard bias underlayer material adjacent the upper portion of the spin valve structure, and including the junction, may be kept relatively thin yet may be made thick enough to provide adequate coverage over the junction region. The increased thickness of the underlayer according to the invention raises the surface upon which the hard bias is deposited, so that alignment of the hard bias with the free layer may be improved.

In some embodiments forming the first underlayer includes depositing Cr, or CrV, or CrTi, or CrMo or CrW at a relatively high deposition angle. In some embodiments forming the second underlayer includes depositing Cr, or CrV, or CrTi, or CrMo or CrW at a relatively low deposition angle.

In some embodiments forming the hard bias layer includes depositing CoPt, or CoCrPt, or CoCrTa, or CoCrPtTa at a relatively low deposition angle.

In some embodiments forming a first underlayer onto the sloped sides of the central region and onto the exposed substrate includes depositing the underlayer material at a deposition angle in a range from about 20° to about 60° from perpendicular to an upper surface of the substrate, in some embodiments at a deposition angle at least about 20° from perpendicular to an upper surface of the substrate, in some embodiments at least about 23° from perpendicular to an upper surface of the substrate.

In some embodiments forming the first underlayer onto the sloped sides of the central region and onto the exposed substrate includes depositing the underlayer material at a deposition angle generally normal to the slope of the sides of the central region at the junction, that is, at a deposition angle about 90°, such as in a range about 85° to about 95°, with respect to the slope of the sides of the central region at the junction.

In some embodiments forming a second underlayer on a portion of the first underlayer includes depositing the underlayer material at a deposition angle in a range about 0° to about 5° from perpendicular to an upper surface of the substrate, that is, generally normal to the upper surface of the substrate, such as at an angle less than about 5° from perpendicular to an upper surface of the substrate.

In some embodiments the sum of a first underlayer thickness and a second underlayer thickness is at least equal to the quantity $FL+T-HS/2-FT$, and is at most equal to the quantity $FL+T-HS/2+FT$, where FL is an elevation of a midplane of the free layer above the top surface of the gap layer, T is the overmill depth, HS is the thickness of the hard bias layer, and FT is the thickness of the free layer; in some embodiments the sum of the first thickness and the second thickness is at least equal to the quantity $FL+T-HS/2-FT/2$, and is at most equal to the quantity FL+T−HS/2+FT/2; and in some embodiments the sum of the first thickness and the second thickness is approximately equal to the quantity FL+T−HS/2.

In practice, the various thicknesses and elevations may vary from the specified values, according to processing variation. Accordingly, an expression herein of thickness or of elevation is intended to include a range of thicknesses or of elevation within such processing variations.

In some embodiments depositing the first underlayer includes depositing the underlayer material to a thickness at the sloped sides of the central region at least about 20 Å, in some embodiments at least about 30 Å, in some embodiments to a thickness at the sloped sides of the central region in a range from about 20 Å to about 80 Å. In some embodiments depositing the first underlayer includes depositing the underlayer material to a thickness above the overmilled region of the gap layer (or, where the gap is not overmilled, then to a thickness above the region of the gap layer laterally adjacent the spin valve construct) at least about 20 Å, in some embodiments at least about 50 Å, in some embodiments to a thickness in a range from about 20 Å to about 80 Å, and in some embodiments in a range from about 50 Å to about 70 Å.

To achieve preferred alignment of the hard bias and the free layer, in some embodiments forming a second underlayer on a portion of the first underlayer includes depositing underlayer material to a thickness great enough so that the midplane of the overlying hard bias layer passes through the free layer; preferably the midplane of the hard bias layer is generally coextensive the midplane of the free layer. The required thickness for the second underlayer depends upon the depth of the gap overmill; and upon the thickness of the first underlayer; and upon the elevation of the free layer above the top surface of the gap, that is, upon the vertical distance from the top surface of the gap to the plane midway the thickness of the free layer. In some embodiments forming the first and second underlayers includes depositing underlayer material to a thickness sufficient to make the first and second underlayers have a combined thickness at least about 60 Å, such as for example in a range from about 60 Å to about 250 Å.

In some embodiments forming the magnetoresistive sensor structure over the substrate, including for example a spin valve structure, and including in some embodiments a bottom spin valve structure, includes forming a structure to a combined thickness in a range from about 200 Å to about 600 Å, such as about 350 Å to about 380 Å, in which the elevation of the midplane of the free layer above the surface of the gap is in a range from about 100 Å to about 500 Å, for example about 200 Å or about 300 Å and in ranges between these specified elevations, such as about 270 Å, for example, in a spin valve structure having a thickness about 380 Å.

In some embodiments ion milling to remove portions of the magnetoresistive sensor structure not shielded by the mask includes overmilling, to remove a portion of the gap layer to a depth in the gap layer in a range up to about 30 Å or more, such as to a depth about 10 Å, or about 20 Å, or about 30 Å; or a depth within the range between these specified depths.

The invention will now be described in further detail by reference to the drawings, which illustrate exemplary embodiments of the invention. The drawings are diagrammatic, showing features of the invention and their relation to other features and structures, and are not made to scale. For improved clarity of presentation, in the Figs. illustrating embodiments of the invention, elements corresponding to elements shown in other drawings are not all particularly renumbered, although they are all readily identifiable in the figures.

Figure 2A:
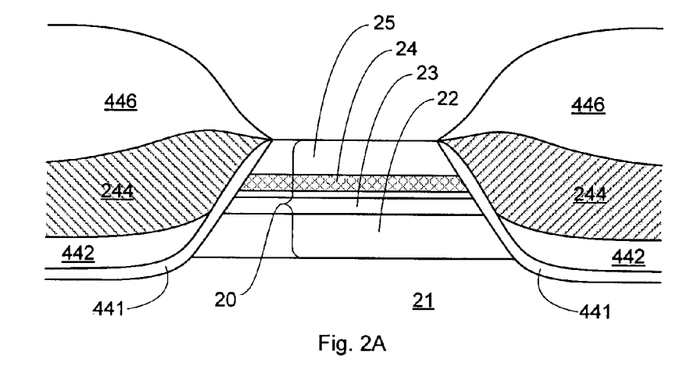
FIG. 2A is a diagrammatic sketch in a sectional view showing a magnetoresistive sensor according to an embodiment of the invention.
Figure 2B:
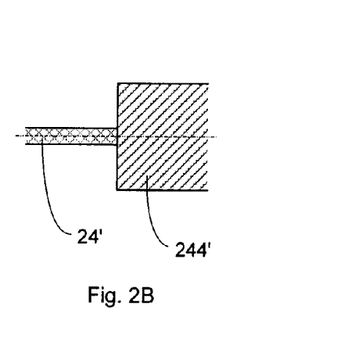
FIG. 2B is a diagram illustrating relative positions of the free layer and the hard bias layer in the magnetoresistive sensor of FIG. 2A according to an embodiment of the invention.

FIGS. 1A and 1B are discussed above. Referring now to FIG. 2A, there is shown a spin valve MR sensor having improved alignment between the hard bias and the free layer according to an embodiment of the invention. The sensor includes a spin valve structure 20 overlying a gap layer 21. In the bottom synthetic spin valve structure shown in this example, the layers include an antiferromagnetic (AFM) layer 22, a pinned layer 23, a free layer 24, and a capping layer 25. According to an embodiment of the invention, the hard bias layer 244 is formed over a hard bias underlayer structure that includes a first underlayer 441 and a second underlayer 442. The first underlayer 441 is a thin layer formed on the sloped sides of the spin valve structure and the exposed portion of the overmilled gap layer. The second underlayer 442 is a thicker layer formed over the portion of the first underlayer laterally adjacent the spin valve structure 20. Electrically conductive leads 446 are formed over hard bias layer 244. Alignment of the hard bias layer 244 with the free layer 24 is improved in the MR sensor according to the invention. As FIG. 2B illustrates diagrammatically, a plane generally parallel to the various layers, and located midway the thickness 244' of the hard bias layer (the hard bias midplane), passes through the free layer 24. The diagram illustrates an ideal alignment, in which a plane generally parallel to the various layers, and located midway the thickness 24' of the free layer is coextensive with the mid-plane of the thickness of the hard bias layer 244'. However, the invention can be practiced without achieving such ideal alignment.

The improved alignment of the hard bias layer with the free layer spin valve MR sensor is obtained in an embodiment of the invention by depositing the hard bias underlayer, in at least two steps, one forming the first underlayer 441 and the other forming second underlayer 442. Stages in the process according to the invention are illustrated in FIGS. 3A-3D.

Figure 3A:
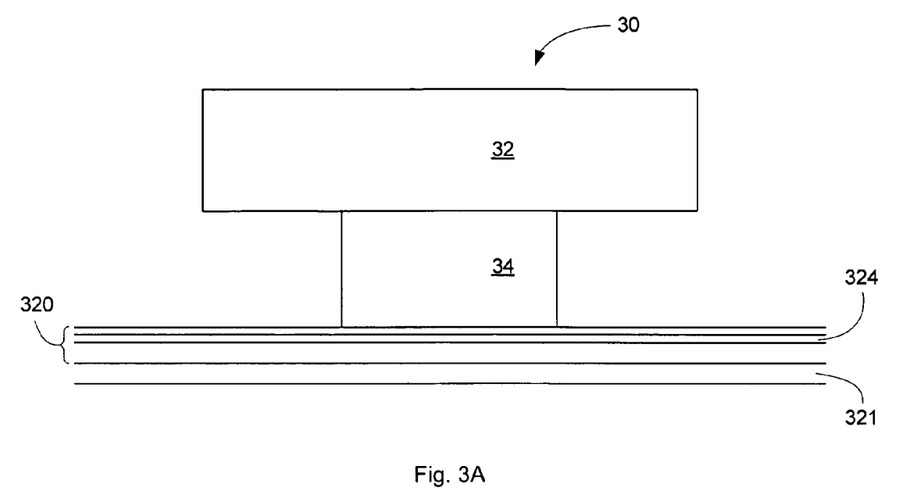
FIGS. 3A-3D are diagrammatic sketches in a sectional view showing stages in a process for making a magnetoresistive sensor according to an embodiment of the invention.
Figure 4:
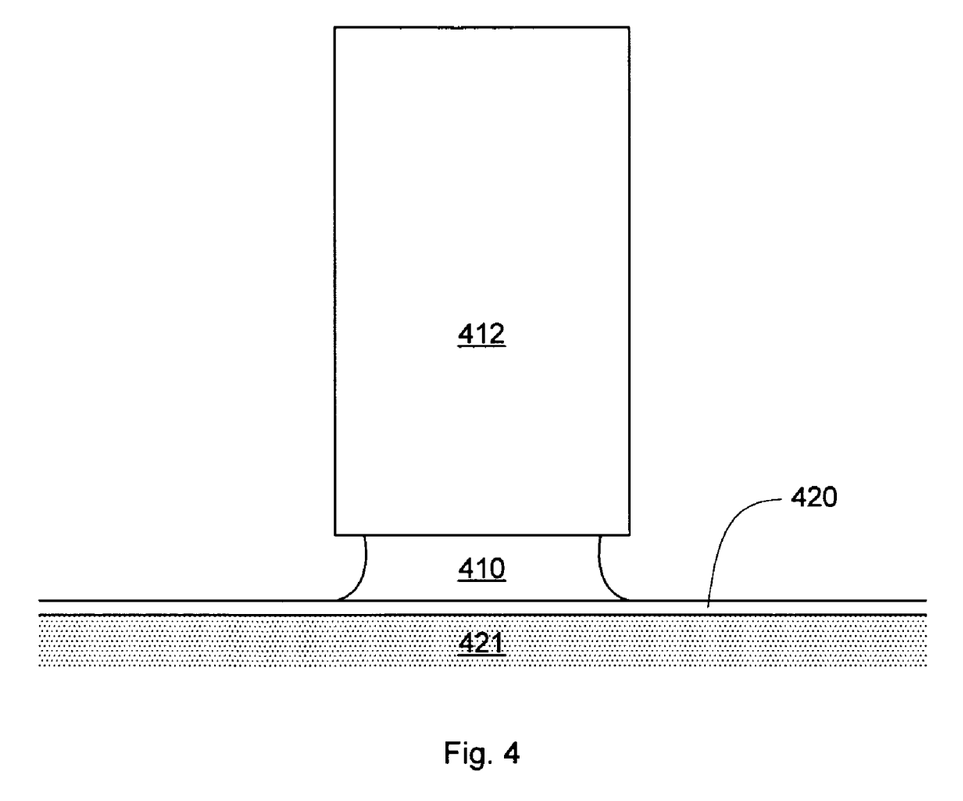
FIG. 4 is a diagrammatic sketch in a sectional view showing a bilayer mask employed in a method for making a magnetoresistive sensor according to an embodiment of the invention.

Referring to FIG. 3A, a gap layer 321 is formed on an upper surface of a substrate, and constituent layers 320 of the spin valve structure are deposited over the gap layer 321. The substrate is typically a wafer, which may be a silicon wafer, for example, or an AlTiC wafer. The gap layer can be $Al_2O_3$; or the gap layer can be XAl, where X is one of Ni, Co, Ti, or Ru. Where the gap layer is $Al_2O_3$, it is typically about 1000 Å thick. The constituent layers 320 of the spin valve structure include, among other layers, a free layer 324. A bilayer mask (stencil) 30 is constructed having an upper mask portion 32 and a lower mask portion 34, by forming a thin lower mask layer over the constituent layers of the spin valve structure, then forming a thick upper mask layer over the lower mask layer, and patterning the upper mask layer, and then removing part of the lower mask layer to provide an undercut beneath the patterned upper mask. The patterned upper mask layer is the imaging layer. Techniques for forming and patterning bilayer masks are known; an example of such a technique is described in U.S. Pat. No. 5,018,037. All patents and patent applications referred to in this specification are incorporated herein by reference. The upper imaging layer is formed of a photoresist, and the edge profile of the patterned upper imaging layer of the stencil is formed by an exposure step followed by a develop step. The lower mask layer is formed of a suitable polymer such as, for example, a poly(methyl ethylene glycol) imide copolymer, and the undercut is created in the lower layer by dissolution and a suitable developer, with the develop time controlled to determine the undercut distance. A patterned mask is shown in more detail in FIG. 4. The patterned upper and lower mask layers are shown patterned over the constituent layers 420 of the spin valve structure, which in turn have been formed over a gap layer 421 on the substrate. The patterned imaging layer 412 may have thickness in the range 400 to 700 nm, for example; the lower layer may have thickness in the range 50 to 90 nm, for example.

Figure 3B:
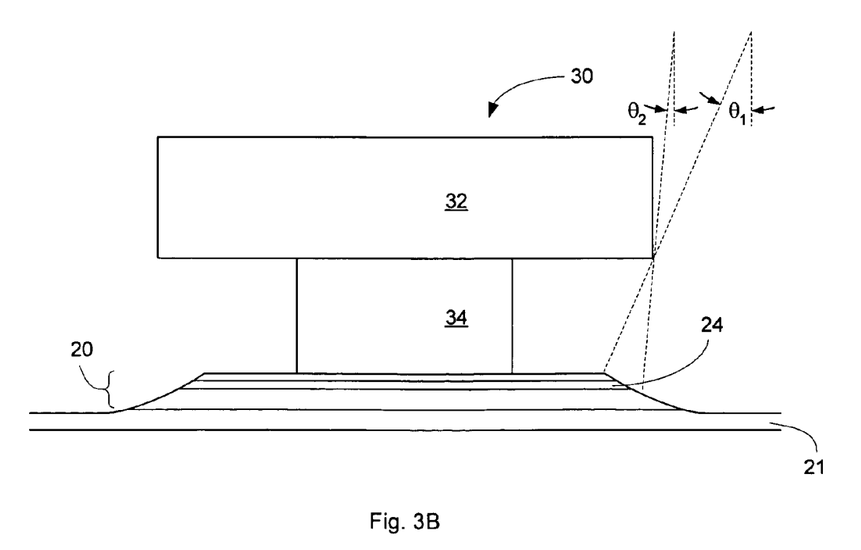

The unmasked areas of the constituent layers 320 of the spin valve structure are then removed by a unidirectional process such as ion milling, for example. The angle of incidence is controlled by tilting the substrate to a suitable degree in relation to the incident beam. Referring now to FIG. 3B, a resulting spin valve structure 20 is shown. Tilting the substrate so that the incident beam comes in at a relatively high angle of incidence, as indicated by the angle $\theta_1$, permits milling to areas beneath the defined edge of the image layer 32. Tilting the substrate so that the incident beam comes in at a relatively low angle of incidence, as indicated by the angle $\theta_2$, limits milling to areas generally outside of the area beneath the edge of the image layer 32. Control of the pitch (tilt) of the substrate in relation to the incident beam, and control of the mill time at the various pitches, results in formation of spin valve structure 20, having sloped sides. Overmilling at the relatively low angle of incidence results in removal of a surface portion of the gap layer, to ensure that the lower spin valve structure material layers 320 have been completely removed.

Figure 3C:
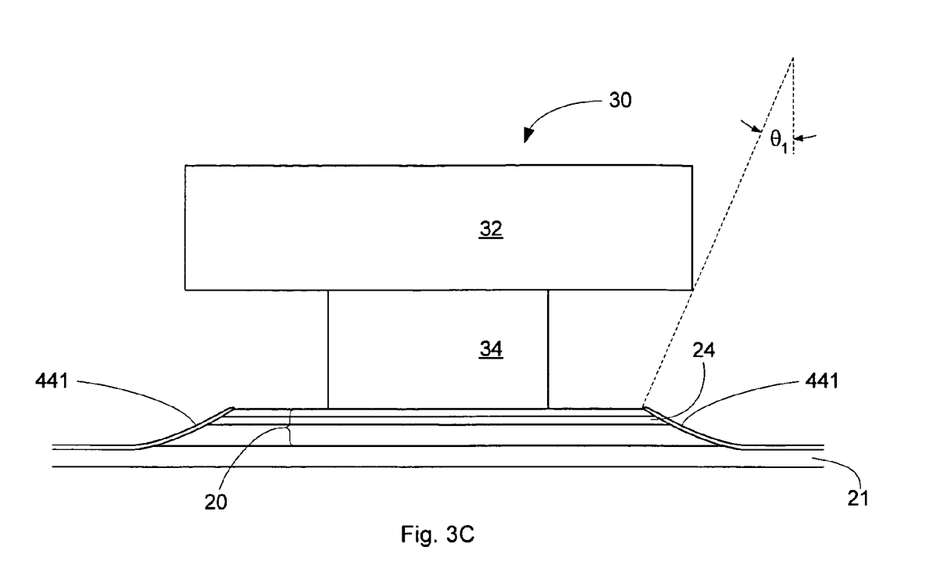

Once the milling process has been completed, a first hard bias underlayer 441 is formed, as shown in FIG. 3C, by depositing (for example by sputtering) an underlayer material at a relatively high angle of incidence, as illustrated by the angle $\theta_1$. The substrate is tilted to a suitable degree in relation to the incident deposition to control the angle $\theta_1$, and thereby to limit the extent to which the material is deposited beneath the defined edge of the image layer 32. Suitable underlayer materials include Cr, and CrY compounds in which Y is V, Ti, Mo, or W. The thickness of the first hard bias underlayer is determined by the deposition rate and the duration of the deposition, and one or both these parameters may be controlled to achieve suitable thickness in the resulting layer. The first underlayer must be thick enough to ensure suitable coverage of the sloping side of the spin valve structure; usually, a thickness at least about 20 Å, and more usually at least about 30 Å, suffices to ensure suitable coverage (i.e. voids or pinholes are not excessive). Preferably the resulting first hard bias underlayer is not thicker than about 80 Å over the sloping side of the spin valve structure.

Figure 3D:
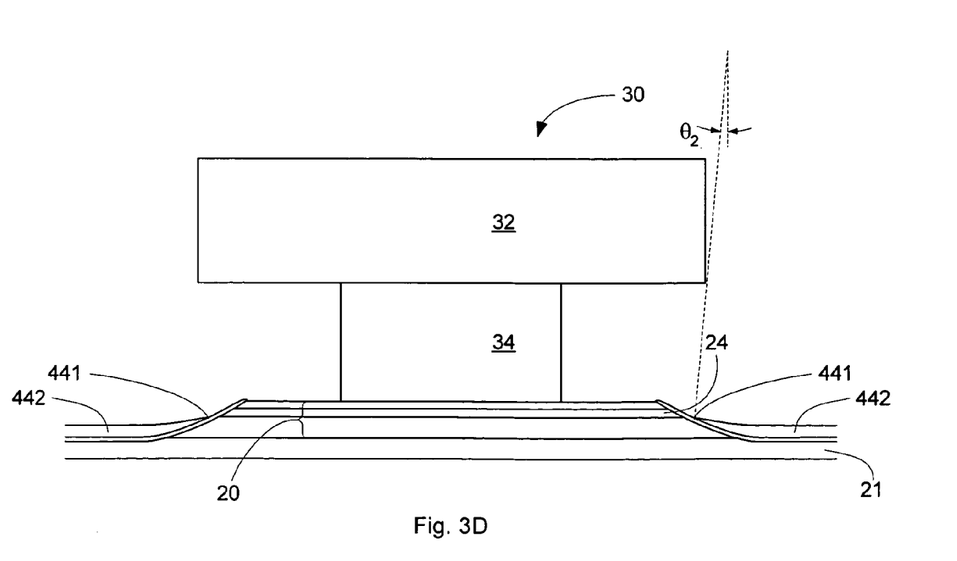

Then, as shown in FIG. 3D, a second hard bias underlayer 442 is deposited (for example by sputtering) over a portion of the first hard bias underlayer 441, by depositing a hard bias underlayer material at a relatively high angle of incidence, as illustrated by the angle $\theta_2$. The substrate is tilted to a suitable degree in relation to the incident deposition to control the angle $\theta_2$, and thereby to limit the extent to which the material is deposited beneath the defined edge of the image layer 32. Suitable underlayer materials include Cr, and CrY compounds in which Y is V, Ti, Mo, or W. The thickness of the first hard bias underlayer is determined by the deposition rate and the duration of the deposition, and one or both these parameters may be controlled to achieve suitable thickness in the resulting layer. The second hard bias underlayer must be thick enough so that the combined thickness of the first and second underlayers raises the subsequently deposited hard bias layer to a level that brings it into alignment with the free layer.

In an ideal case, the hard bias layer is in alignment with the free layer when a midplane of the hard bias layer passes through the free layer. That is, the layers are aligned when a plane generally parallel to the bulk surface of the substrate, located midway between the top and the bottom surfaces of the hard bias layer (the hard bias midplane) is on a level between the top and bottom surfaces of the free layer. In a most ideal case, the hard bias midplane is coextensive with a midplane of the free layer.

Figure 5:
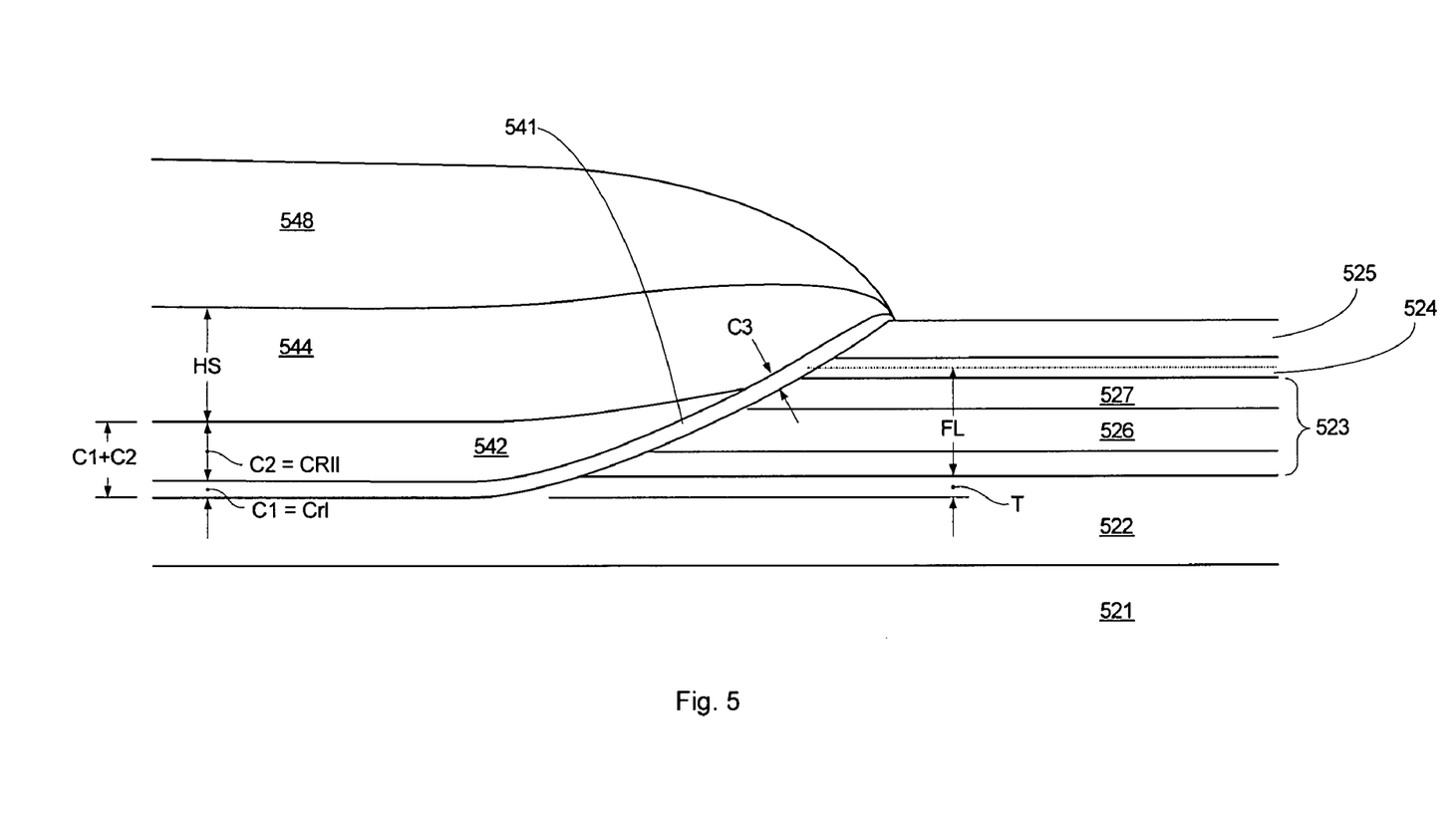
FIG. 5 is a diagrammatic sketch in a sectional view showing details of features of a magnetoresistive sensor according to an embodiment of the invention.

The relationships of the positions of the various layers of the MR device according to an embodiment of the invention are shown in greater detail in FIG. 5. Here the substrate 521 is overlain by a gap layer 522, upon which the spin valve structure 523, 524, 525 is formed, including the free layer 524 and a capping layer 525. The part of the spin valve structure referred to in the drawing as 523 includes several layers; shown by way of example are antiferromagnetic (AFM) layer 526 and pinned layer 527, and there may be more than one layer in addition to the capping layer 525 over the free layer 524. Also shown in FIG. 5 are a hard bias layer 544 and lead 548. A first hard bias underlayer 541 is deposited onto the sloping sides of the spin valve structure and onto the overmilled area of the gap layer. The first underlayer 541 a thickness C1 over the overmilled area of the gap layer, and a thickness C3 over the slope of the spin valve structure. Preferably, in an example where the first hard bias underlayer is Cr, C3 can be at least about 20 Å or 30 Å, and may be as much as about 70 Å; that is, C3 is preferably in the range about 20 Å to about 70 Å, and more usually in the range about 30 Å to about 70 Å. And, preferably, in an example where the first hard bias underlayer is Cr, C1 can be at least about 20 Å or 30 Å or 50 Å, and may be as much as about 80 Å or 70 Å; that is, C1 is preferably in the range about 20 Å to about 80 Å, and more usually in the range about 30 Å to about 70 Å, such as in the range about 50 Å to about 70 Å. The second hard bias underlayer 542 has a thickness C2 over the first underlayer above the overmilled area of the gap layer. Preferably, in an example where the spin valve structure has a thickness (height) in the range about 350 Å to about 380 Å, a combined thickness of the first and second underlayers above the overmilled gap area (the sum of C2 and C1) at least about 70 Å to about 200 Å, will be sufficient to bring the subsequently formed hard bias layer 544 into alignment with the free layer.

Figure 6:
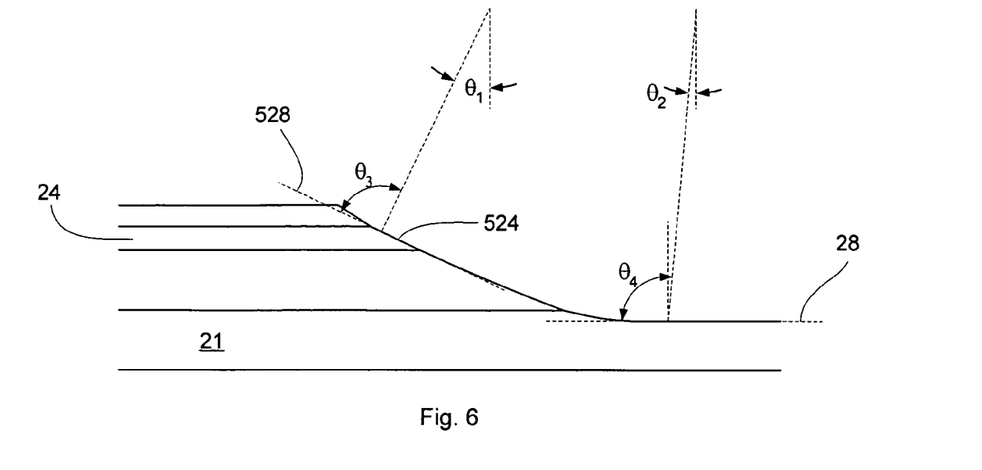
FIG. 6 is a diagrammatic sketch in a sectional view illustrating certain parameters employed in the process according to an embodiment of the invention.

The extent to which the underlayer material may be deposited beneath the overhang of the image resist layer is affected by the height of the mask edge above the deposition surface in combination with the deposition angle. For the first underlayer deposition, the deposition angle (i.e. high deposition angle) is preferably selected to be generally perpendicular to the slope of the side of the spin valve structure. And, for the second underlayer, the deposition angle (i.e. first lower deposition angle) is selected to be generally perpendicular to the surface of the first underlayer over the overmilled area of the gap layer. These relationships are illustrated in FIG. 6. The milled side of the spin valve structure is generally not planar, bur rather has a slightly concave surface. Accordingly, the high deposition angle $\theta_1$ used for the first underlayer is selected so that the angle of incidence of the deposition material onto the side of the spin valve structure is approximately normal to a tangent 628 to the surface 624 at the free layer 24; that is, so that the angle $\theta_3$ is in the range about 85° to 95°, or within the range about +50 or −5° from perpendicularity. Because the slope of the side of the spin valve structure at the free layer is usually in a range about 25° to about 45°, the high deposition angle is usually in a range about 20° to about 50°. And, accordingly, the first lower deposition angle $\theta_2$ used for the second underlayer is selected so that the angle of incidence of the deposition material onto the surface of the first underlayer above the overmilled area of the gap layer is approximately normal to the surface 28; that is, so that the angle $\theta_4$ is in the range about 85° to 95°, or within the range about +5° or −5° from perpendicularity. Because the surface of the first underlayer above the overmilled gap layer is generally horizontal, as is the overmilled gap layer surface, the angles $\theta_4$ and $\theta_2$ are each in the range about +5° to −5°.

Figure 7:
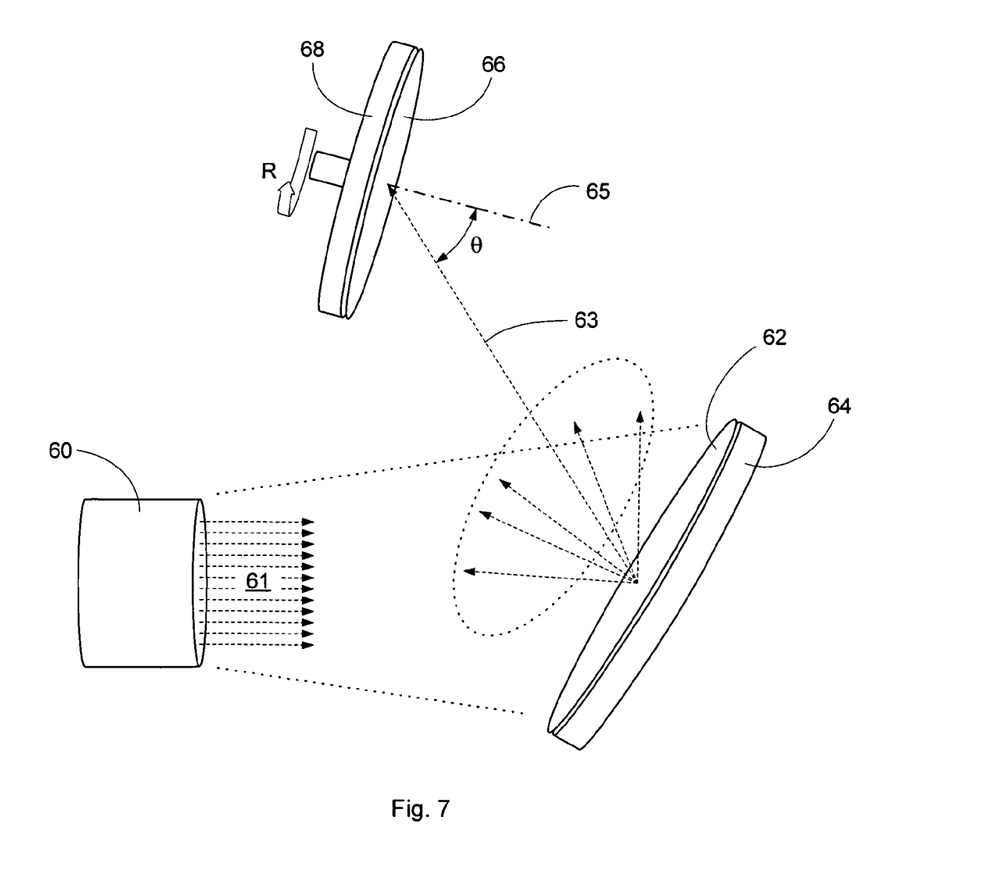
FIG. 7 is a diagrammatic sketch illustrating parts of apparatus employed in carrying out a process according to an embodiment of the invention.

FIG. 7 shows parts of apparatus that may be used to form the first and second underlayers according to the invention. The substrate 76, with the patterned bilayer stencil having been formed over the constituent layers of the spin valve structure, is mounted on a holder 78. Holder 78 is arranged so that it can be rotated about an axis 75 perpendicular to the substrate surface, as indicated at R, and also tilted within a range of angles $\theta$ with respect to a shower of particles 73 ejected from the surface of a target 72. An ion source 70 generates ions and directs the ions in a beam 71 toward a target material 72 on a target holder 74. The ions strike the target material, and cause a shower of particles to eject from the target. Some of the ejected particles 73 shower the substrate 76 at the selected angle $\theta$.

The target material is selected according to the desired material to be deposited, as is well known in the deposition art.

EXAMPLES

Figure 8:
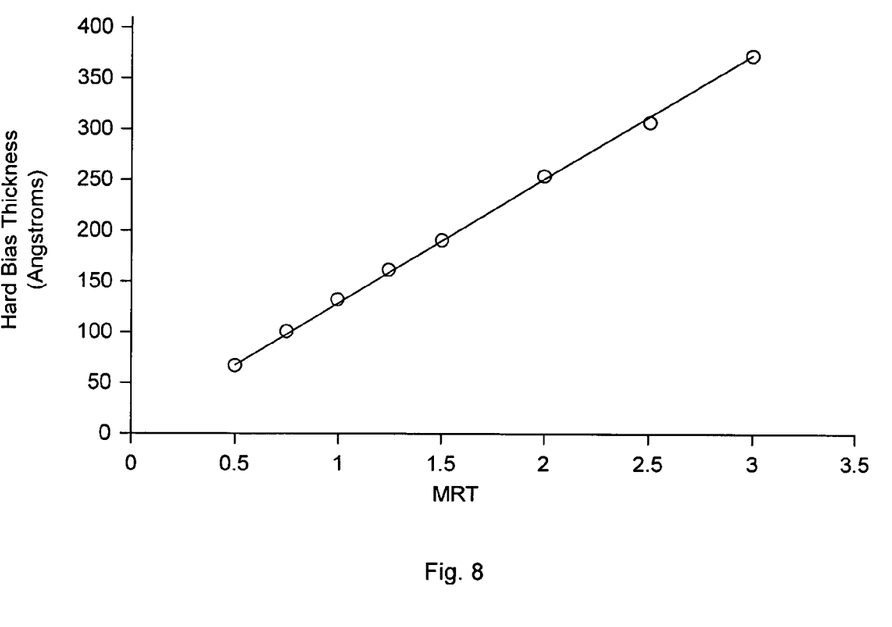
FIG. 8 is a plot showing a relation between MRT and hard bias layer thickness.

The following examples illustrate design criteria for the thickness of the second underlayer deposition according to the invention, for selected remanent magnetization thickness (MRT), at two selected spin valve structure and overmill thicknesses. MRT depends upon materials of the hard bias layer (which may be, for example, CoPt) and the process conditions, as well as the thickness of the hard bias layer. Generally, as shown for example in FIG. 8, hard bias thickness varies linearly with MRT, over thicknesses in a range between about 50 Ångstroms and about 400 Ångstroms, and over MRT in a range between about 0.5 and about 3.

By way of illustration, in various embodiments according to the invention: the spin valve construct may have a thickness in a range about 200 Ångstroms to about 400 Ångstroms, and the elevation of the free layer (that is, the elevation of the midplane of the free layer above the top surface of the underlying gap layer) varies according to the number and thicknesses of the various layers in the spin valve construct; the gap layer may be overmilled to an overmill depth up to as much as about 30 Ångstroms, or there may be no overmilling; the hard bias layer may have a thickness over the overmilled area of the gap layer in a range about 60 Ångstroms to about 400 Ångstroms; and the first underlayer may have a thickness above the overmilled region of the gap in a range about 50 Ångstroms to about 70 Ångstroms.

The thickness of the second Cr underlayer (CRII) over the first Cr underlayer and above the overmilled region for good alignment is approximately equal to:

FL+T−HS/2−CrI,

Where (see FIG. 5) CrI is the thickness of the first Cr underlayer above the overmilled region; FL is the elevation of the midplane of the free layer above the top surface of the gap layer, T is the overmill depth, and HS is the thickness of the hard bias layer over the second Cr layer above the overmilled region. In these examples, the design thickness of the first Cr underlayer (CRI) is 50 Ångstroms.

Example 1

In this example, the design height FL of the midplane of the free layer over the top surface of the gap is 200 Ångstroms, and the design depth T of the overmill is 20 Ångstroms. The required design thickness of the second Cr deposition (CRII, Ångstroms) for six selected hard bias thicknesses (HS, Ångstroms) and corresponding MRTs is shown in the following Table A:

TABLE A

| MRT | HS | CRII |
|---|---|---|
| 2.5 | 305 | 17.5 |
| 2 | 250 | 45 |
| 1.5 | 187 | 76.5 |
| 1.25 | 157 | 91.5 |
| 1 | 128 | 106 |
| 0.75 | 96 | 122 |

Example 2

In this example, the design height FL of the midplane of the free layer over the top surface of the gap is 300 Ångstroms, and the design depth T of the overmill is 10 Ångstroms. The required design thickness of the second Cr deposition (CRII, Ångstroms) for six selected hard bias thicknesses (HS, Ångstroms) and corresponding MRTs is shown in the following Table B:

TABLE B

| MRT | HS | CRII |
|---|---|---|
| 3 | 370 | 75 |
| 2.5 | 305 | 107.5 |
| 2 | 250 | 135 |
| 1.5 | 187 | 166.5 |
| 1.25 | 157 | 181.5 |
| 1 | 128 | 196 |

Other embodiments are within the following claims.

What is claimed is:

1. A method for forming a hard bias structure in a magnetoresistive sensor, comprising providing a substrate comprising a gap layer having a top surface;

forming a magnetoresistive sensor structure over the substrate, the magnetoresistive sensor structure comprising at least a soft magnetic bias layer, a spacer layer over the soft magnetic bias layer, and a magnetoresistive layer over the spacer layer;

forming a mask over a portion of the magnetoresistive sensor structure to define a central region of the magnetoresistive sensor;

ion milling the masked magnetoresistive structure to remove portions of the magnetoresistive sensor structure not shielded by the mask, to form a central region of the magnetoresistive sensor having sloped sides, and to expose a region of the gap layer laterally adjacent the sloped sides of the central region;

forming a first underlayer onto at least the sloped sides of the central region by depositing a first underlayer material at a high deposition angle;

forming a second underlayer at least partially overlapping the first underlayer by depositing a second underlayer material at a first lower deposition angle;

and forming a hard bias layer over at least a portion of the second underlayer by depositing a hard bias material at a second lower deposition angle, wherein the first lower deposition angle is approximately equal to the second lower deposition angle.

2. The method of claim 1 wherein forming the first underlayer comprises depositing Cr.

3. The method of claim 1 wherein forming the first underlayer comprises depositing CrY, wherein Y is selected from the group consisting of V, Ti, Mo and W.

4. The method of claim 1 wherein forming the first underlayer comprises depositing CrW.

5. The method of claim 1 wherein forming the second underlayer comprises depositing Cr.

6. The method of claim 1 wherein forming the second underlayer comprises depositing CrY, wherein Y is selected from the group consisting of V, Ti, Mo, and W.

7. The method of claim 1 wherein forming the hard bias layer comprises depositing CoPt.

8. The method of claim 1 wherein forming the hard bias layer comprises depositing CoCrPt.

9. The method of claim 1 wherein forming the hard bias layer comprises depositing CoCrTa.

10. The method of claim 1 wherein forming the hard bias layer comprises depositing CoCrPtTa.

11. The method of claim 1 wherein depositing the first underlayer comprises depositing the underlayer material to a thickness at least about 20 Å at the sloped sides of the central region.

12. The method of claim 11 wherein depositing the first underlayer comprises depositing the underlayer material to a thickness at least about 30 Å at the sloped sides of the central region.

13. The method of claim 1 wherein depositing the first underlayer comprises depositing the underlayer material to a thickness in a range from about 20 Å to about 80 Å at the sloped sides of the central region.

14. The method of claim 1 wherein depositing the first underlayer comprises depositing the underlayer material to a thickness at least about 20 Å at the exposed region of the gap layer.

15. The method of claim 14 wherein depositing the first underlayer comprises depositing the underlayer material to a thickness at least about 50 Å at the exposed region of the gap layer.

16. The method of claim 1 wherein depositing the first underlayer comprises depositing the underlayer material to a thickness in a range from about 20 Å to about 80 Å at the exposed region of the gap layer.

17. The method of claim 1 wherein depositing the first underlayer comprises depositing the underlayer material to a thickness in a range from about 50 Å to about 70 Å at the exposed region of the gap layer.

18. The method of claim 1 wherein forming a first underlayer onto the sloped sides of the central region and onto the exposed substrate comprises depositing the underlayer material at a deposition angle in a range from about 20° to about 60° from perpendicular to an upper surface of the substrate.

19. The method of claim 1 wherein forming a second underlayer on a portion of the first underlayer comprises depositing the underlayer material to a thickness sufficient to make the first and second underlayers have a combined thickness over the region of the gap layer laterally adjacent the central region at least about 60 Å.

20. The method of claim 19 wherein forming a second underlayer on a portion of the first underlayer comprises depositing the underlayer material to a thickness sufficient to make the first and second underlayers have a combined thickness over the region of the gap layer laterally adjacent the central region in a range from about 60 Å to about 250 Å.

21. The method of claim 1 wherein forming a second underlayer on a portion of the first underlayer comprises depositing underlayer material to a thickness great enough so that a midplane of the hard bias layer passes through the free layer.

22. A method for forming a hard bias structure in a magnetoresistive sensor, comprising providing a substrate comprising a clap layer having a top surface;

forming a magnetoresistive sensor structure over the substrate, the magnetoresistive sensor structure comprising at least a soft magnetic bias layer, a spacer layer over the soft magnetic bias layer, and a magnetoresistive layer over the spacer layer;

forming a mask over a portion of the magnetoresistive sensor structure to define a central region of the magnetoresistive sensor;

ion milling the masked magnetoresistive structure to remove portions of the magnetoresistive sensor structure not shielded by the mask, to form a central region of the magnetoresistive sensor having sloped sides, and to expose a region of the clap layer laterally adjacent the sloped sides of the central region;

forming a first underlayer onto at least the sloped sides of the central region by depositing a first underlayer material at a high deposition angle;

forming a second underlayer at least partially overlapping the first underlayer by depositing a second underlayer material at a first lower deposition angle;

and forming a hard bias layer over at least a portion of the second underlayer by depositing a hard bias material at a second lower deposition angle, wherein forming the first underlayer onto the sloped sides of the central region and onto the exposed substrate comprises depositing the underlayer material at a deposition angle at least about 20° from perpendicular to an upper surface of the substrate.

23. The method of claim 22 wherein forming the first underlayer onto the sloped sides of the central region and onto the exposed substrate comprises depositing the underlayer material at a deposition angle at least about 23° from perpendicular to an upper surface of the substrate.

24. A method for forming a hard bias structure in a magnetoresistive sensor, comprising providing a substrate comprising a clap layer having a top surface;

forming a magnetoresistive sensor structure over the substrate, the magnetoresistive sensor structure comprising at least a soft magnetic bias layer, a spacer layer over the soft magnetic bias layer, and a magnetoresistive layer over the spacer layer;

forming a mask over a portion of the magnetoresistive sensor structure to define a central region of the magnetoresistive sensor;

ion milling the masked magnetoresistive structure to remove portions of the magnetoresistive sensor structure not shielded by the mask, to form a central region of the magnetoresistive sensor having sloped sides, and to expose a region of the clap layer laterally adjacent the sloped sides of the central region;

forming a first underlayer onto at least the sloped sides of the central region by depositing a first underlayer material at a high deposition angle;

forming a second underlayer at least partially overlapping the first underlayer by depositing a second underlayer material at a first lower deposition angle;

and forming a hard bias layer over at least a portion of the second underlayer by depositing a hard bias material at a second lower deposition angle, wherein forming the first underlayer onto the sloped sides of the central region and onto the exposed substrate comprises depositing the underlayer material at a deposition angle generally normal to the slope of the sides of the central region at the junction.

25. The method of claim 24 wherein forming the first underlayer onto the sloped sides of the central region and onto the exposed substrate comprises depositing the underlayer material at a deposition angle in a range about 85° to about 95° with respect to the slope of the sides of the central region at the junction.

26. The method of claim 24 wherein forming the first underlayer onto the sloped sides of the central region and onto the exposed substrate comprises depositing the underlayer material at a deposition angle about 90° with respect to the slope of the sides of the central region at the junction.

27. A method for forming a hard bias structure in a magnetoresistive sensor, comprising providing a substrate comprising a clap layer having a top surface;

forming a magnetoresistive sensor structure over the substrate, the magnetoresistive sensor structure comprising at least a soft magnetic bias layer, a spacer layer over the soft magnetic bias layer, and a magnetoresistive layer over the spacer layer;

forming a mask over a portion of the magnetoresistive sensor structure to define a central region of the magnetoresistive sensor;

ion milling the masked magnetoresistive structure to remove portions of the magnetoresistive sensor structure not shielded by the mask, to form a central region of the magnetoresistive sensor having sloped sides and to expose a region of the clap layer laterally adjacent the sloped sides of the central region;

forming a first underlayer onto at least the sloped sides of the central region by depositing a first underlayer material at a high deposition angle;

forming a second underlayer at least partially overlapping the first underlayer by depositing a second underlayer material at a first lower deposition angle;

and forming a hard bias layer over at least a portion of the second underlayer by depositing a hard bias material at a second lower deposition angle, wherein forming a second underlayer on a portion of the first underlayer comprises depositing the underlayer material at a deposition angle generally normal to an upper surface of the substrate.

28. The method of claim 27 wherein forming a second underlayer on a portion of the first underlayer comprises depositing the underlayer material at a deposition angle in a range about 0° to about 5° from perpendicular to an upper surface of the substrate.

29. The method of claim 27 wherein forming a second underlayer on a portion of the first underlayer comprises depositing the underlayer material at a deposition angle less than about 5° from perpendicular to an upper surface of the substrate.

30. A method for forming a hard bias structure in a magnetoresistive sensor, comprising providing a substrate comprising a clap layer having a top surface;

forming a magnetoresistive sensor structure over the substrate, the magnetoresistive sensor structure comprising at least a soft magnetic bias layer, a spacer layer over the soft magnetic bias layer, and a magnetoresistive layer over the spacer layer;

forming a mask over a portion of the magnetoresistive sensor structure to define a central region of the magnetoresistive sensor;

ion milling the masked magnetoresistive structure to remove portions of the magnetoresistive sensor structure not shielded by the mask, to form a central region of the magnetoresistive sensor having sloped sides and to expose a region of the clap layer laterally adjacent the sloped sides of the central region;

forming a first underlayer onto at least the sloped sides of the central region by depositing a first underlayer material at a high deposition angle;

forming a second underlayer at least partially overlapping the first underlayer by depositing a second underlayer material at a first lower deposition angle;

and forming a hard bias layer over at least a portion of the second underlayer by depositing a hard bias material at a second lower deposition angle, wherein ion milling to remove portions of the magnetoresistive sensor structure not shielded by the mask further comprises overmilling, to remove a portion of the gap layer.

31. The method of claim 30 wherein the overmilling comprises removing a portion of the gap layer to a depth in the gap layer in a range up to about 30 Å.

32. The method of claim 30 wherein the overmilling comprises removing a portion of the gap layer to a depth in the gap layer in a range up to about 20 Å.

33. The method of claim 32 wherein the overmilling comprises removing a portion of the gap layer to a depth in the gap layer in a range up to about 10 Å.

34. The method of claim 30 wherein forming the first underlayer comprises depositing the first underlayer material to a first thickness and forming the second underlayer comprises depositing the second underlayer material to a second thickness, and the sum of the first thickness and the second thickness is at least equal to the quantity FL+T−HS/2−FT, and is at most equal to the quantity

FL+T−HS/2+FT, where FL is an elevation of a midplane of the free layer above the top surface of the gap layer, T is the overmill depth, HS is the thickness of the hard bias layer, and FT is the thickness of the free layer.

35. The method of claim 30 wherein forming the first underlayer comprises depositing the first underlayer material to a first thickness and forming the second underlayer comprises depositing the second underlayer material to a second thickness, and the sum of the first thickness and the second thickness is at least equal to the quantity

FL+T−HS/2−FT/2, and is at most equal to the quantity $$FL+T-HS/2+FT/2,$$

where FL is an elevation of a midplane of the free layer above the top surface of the gap layer, T is the overmill depth, HS is the thickness of the hard bias layer, and FT is the thickness of the free layer.

36. The method of claim 30 wherein forming the first underlayer comprises depositing the first underlayer material to a first thickness and forming the second underlayer comprises depositing the second underlayer material to a second thickness, and the sum of the first thickness and the second thickness is approximately equal to the quantity $$FL+T-HS/2,$$

where FL is an elevation of a midplane of the free layer above the top surface of the gap layer, T is the overmill depth, and HS is the thickness of the hard bias layer.

* * * * *

UNITED STATES PATENT AND TRADEMARK OFFICE
CERTIFICATE OF CORRECTION

| | |
|---|---|
| PATENT NO. | : 7,284,316 B1 |
| APPLICATION NO. | : 10/991712 |
| DATED | : October 23, 2007 |
| INVENTOR(S) | : Yiming Huai et al. |

It is certified that error appears in the above-identified patent and that said Letters Patent is hereby corrected as shown below:

Claim 22, Column 12, Line 21: Delete "clap" and insert --gap--.

Claim 22, Column 12, Line 35: Delete "clap" and insert --gap--.

Claim 24, Column 12, Line 58: Delete "clap" and insert --gap--.

Claim 24, Column 13, Line 5: Delete "clap" and insert --gap--.

Claim 27, Column 13, Line 33: Delete "clap" and insert --gap--.

Claim 27, Column 13, Line 48: Delete "clap" and insert --gap--.

Claim 30, Column 14, Line 8: Delete "clap" and insert --gap--.

Claim 30, Column 14, Line 22: Delete "clap" and insert --gap--.

Signed and Sealed this

Sixteenth Day of February, 2010

David J. Kappos
*Director of the United States Patent and Trademark Office*